Dec. 31, 1968   S. B. WILLIAMS ETAL   3,418,854
DIAPHRAGM TYPE INSTRUMENT

Filed May 19, 1966

INVENTORS
SIDNEY B. WILLIAMS
ALAN C. BURGESS
BY
*Blair Buckles & Cesari*
ATTORNEYS

United States Patent Office 3,418,854
Patented Dec. 31, 1968

1

3,418,854
DIAPHRAGM TYPE INSTRUMENT
Sidney B. Williams, Lexington, and Alan C. Burgess, Lynnfield, Mass., assignors to Trans-Sonics Incorporated, Lexington, Mass.
Filed May 19, 1966, Ser. No. 551,406
15 Claims. (Cl. 73—407)

ABSTRACT OF THE DISCLOSURE

A differential pressure transducer having a thin diaphragm utilizes a circular flanged clamping structure with outer peripheral edges diverging from each other to clamp the diaphragm in tension more strongly along an inner circumference adjacent its free span than along its outer periphery. This minimizes inward slippage of the diaphragm in the clamping structure during deflection.

---

This invention relates to a diaphragm type differential pressure transducer. More particularly, it relates to a transducer provided with a simple and relatively inexpensive clamping structure which exerts maximum clamping force on the diaphragm immediately adjacent to the free span thereof. The invention also concerns a method for making the transducer.

The invention provides an improvement over the transducer disclosed in U.S. Patent No. 2,999,386. That patent describes a pressure transducer in which a diaphragm is clamped under tension by a clamping structure to which the diaphragm is essentially bonded. This minimizes slippage of the diaphragm in the clamping structure when it is deflected in response to a differential pressure sensed by the instrument. The clamping elements specifically described in the patent are made of glass. The bonding to the diaphragm is effected by exerting forces of the order of several tons on the glass elements. In other transducers welding or brazing is used to bond the diaphragm to metallic clamping elements.

A principal object of the present invention is to provide a diaphragm type pressure transducer characterized by relatively low cost and minimal breakage, particularly as compared with transducers using glass clamping elements.

Another object of the invention is to provide a transducer of the above type characterized by minimal slippage of the diaphragm within the clamping structure.

A further object of the invention is to provide a transducer of the above type in which the clamping process has negligible effect on the characteristics of the diaphragm.

A furter object of the invention is to provide an economical method for fabricating a transducer of the above type.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which.

In general, a transducer embodying the invention employs a pair of clamps, each of which has an annular flange whose radially inner edge defines the free span of the diaphragm. In the free state of the clamps the opposed clamping surfaces of the flanges are not parallel to the plane of the diaphragm, but rather are angled away therefrom so that the outer edges of the flanges are farther from the diaphragm than the inner edges. Thus, when the clamping members are brought together, only the radially inner edges of the flanges initially contact the diaphragm. The outer edges are then compressed together and held in that position, thereby exerting a very substantial force on the diaphragm at the inner edges, i.e., immediately adjacent to the free span of the diaphragm.

Figure 1:
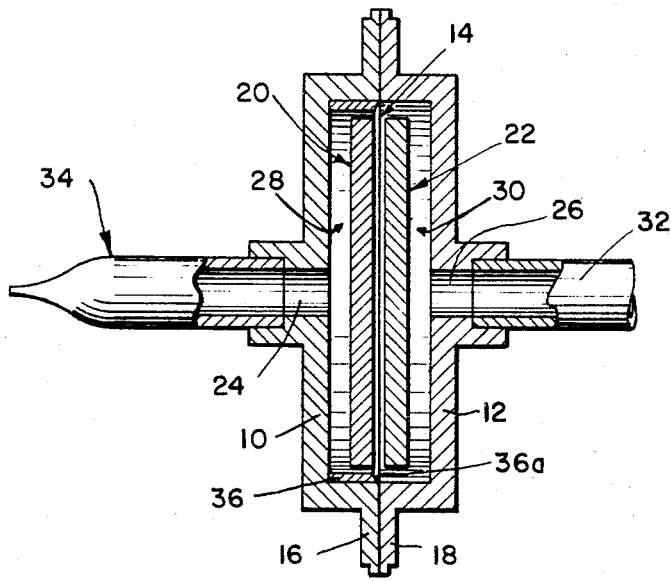
FIG. 1 is a simplified cross-section of a transducer embodying the invention.

More specifically, as shown in FIG. 1, a transducer incorporating the features of the invention comprises a pair of cup-like shells 10 and 12 which serve as a housing for the unit and also as a clamp for a pressure responsive diaphragm 14. Diaphragm clamping is accomplished by flanges 16 and 18 integral with the shells. Electrodes 20 and 22 are disposed on opposite sides of the diaphragm and thus the capacitance between the diaphragm and each of the electrodes is a function of the differential pressure across the diaphragm. These capacitances are compared in a conventional electrical circuit connected to the transducer to provide an electrical signal indicative of the differential pressure. The sources of the pressures to be compared by the transducer are connected through apertures 24 and 26 in the shells 10 and 12 into chambers 28 and 30 defined by the shells and the diaphragm 14. The illustrated transducer is arranged to measure the absolute pressure of a source (not shown) connected to the chamber 30 by a tube 32. Accordingly, the chamber 28 is exhausted and a tube 34 seated in the aperture 24 is suitably pinched off to maintain a vacuum in this chamber.

A backup ring 36, threaded into the shell 10, occupies most of the space between the electrode 20 and the circumferential wall of the shell. The ring 36, whose function is to protect the diaphragm 14 from overpressure, is tapered as shown at 36a to correspond to the form of the diaphragm when it undergoes the maximum permissible excursion into the chamber 28. This prevents the diaphragm from exceeding its elastic limit when excessive pressure is admitted into the chamber 30. In the illustrated transducer the chamber 30 will always have a higher pressure than the chamber 28. However, in applications where either of the chambers may have the higher pressure, a similar backup ring will ordinarily be included within the chamber 30 also.

Figure 2:
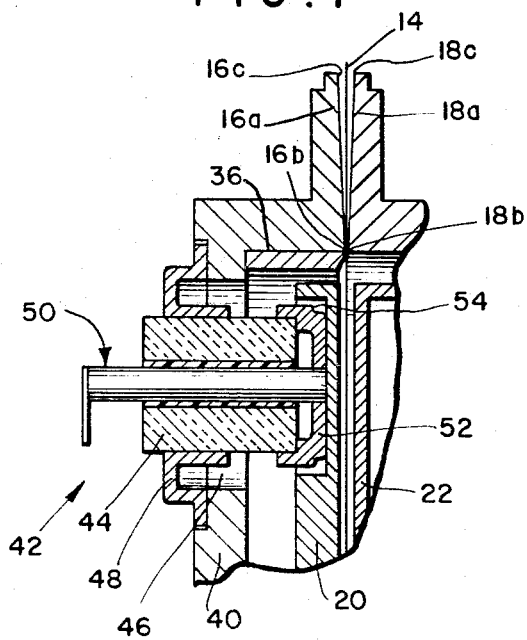
FIG. 2 is an enlarged fragmentary cross-section of the transducer.

FIG. 2 shows the transducer shortly prior to the final steps in its fabrication. The diaphragm 14, which extends outwardly beyond the flanges 16 and 18 is being held in tension by a conventional tension-producing structure (not shown). The shells 10 and 12, to which the electrodes 20 and 22 and associated structure have previously been assembled, are brought to bear on the diaphragm. The opposing faces of the flanges 16a and 18a of the flanges 16 and 18 have a continuous taper so that they are angled away from the plane of the diaphragm 14 proceeding radially in an outward direction. Thus, initially only the inner edges 16b and 18b contact the diaphragm.

Next, a clamping force is exerted on the flanges 16 and 18 near the outer edges 16c and 18c thereof, thereby bringing these outer edges together. This force effectively creates a net torque about an axis in the plane of the diaphragm and coincident with its inner periphery to rotate the outer edges toward each other. A very substantial force must be applied to the relatively thick flanges to accomplish this, and it will be apparent that most of the reaction to this force is supplied at and in the vicinity of the inner edges 16b and 18b. Thus, most of this very substantial force serves to clamp the diaphragm 14 along the inner edges, i.e., adjacent to the free span of the diaphragm within the transducer.

Finally, the flanges are welded together along the edges 16c and 18c to maintain them in their clamping position. The external clamping device can then be removed and the exterior portion of the diaphragm 14 trimmed from the transducer. A series of bolts can be used to accomplish the final clamping function instead of the weld. However, welding is generally to be preferred because it provides a hermetic seal between the shells 10 and 12. It is not always necessary to bring the flange edges 16c and 18c all the way in against the diaphragm in order to provide sufficient clamping force. However, the welding of the flanges is facilitated by having them as close together as possible, i.e., bearing against the diaphragm 14.

Figure 3:
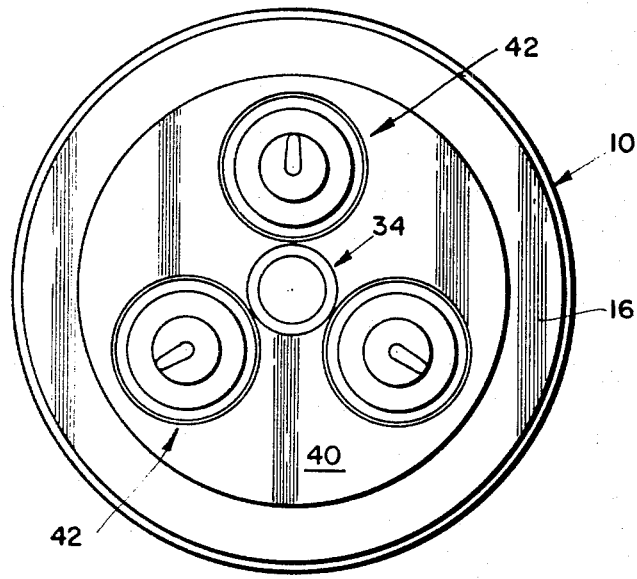
FIG. 3 is an end view of the transducer.

With further reference to FIGS. 2 and 3, each of the electrodes 20 and 22 is supported from the back wall 40 of its associated shell by three support structures generally indicated at 42. Each of the structures 42 includes a ceramic bushing 44 extending through an aperture 46 and held in place by a ring 48. The ring 48 is welded or brazed to both the wall 40 and the ceramic bushing 44, although other methods of securing these parts may be used. A terminal conductor 50 extending through the bushing 44 is welded to a metallic cap 52 covering the inner end of the bushing and suitably welded or brazed thereto to provide a hermetic seal. The cap 52 fits within a recess 54 in the electrode, with a welded or hard solder connection between the cap and the electrode.

This construction of the supporting structures 42 provides a rugged support for the electrodes 20 and 22, yet is relatively easy to assemble.

From the foregoing, it will be apparent that we have provided a rugged transducer which accomplishes the desired function of exerting a large clamping force on the diaphragm immediately adjacent to its free span. The transducer can be fabricated at relatively low cost, and we have described a simple method for doing so.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. An instrument for measuring the deflection of a diaphragm with respect to an object, said instrument comprising
  (A) first and second support members having opposed annular surfaces,
  (B) a diaphragm disposed between said annular surfaces,
  (C) each annular surface
    (1) having an inner periphery in engagement with said diaphragm and substantially in register with the inner periphery on the other annular surface,
    (2) being so relieved that pairs of opposed points located on the respective support members and spaced inward or outward from said inner periphery are normally further removed from each other than are pairs of points located on the inner peripheries thereof,
      (a) the two surfaces outward of the inner peripheries being angularly rotated about the inner peripheries toward each other relative to the unstressed position,
      (b) said inner peripheries compressively engaging opposite sides of said diaphragm,
    (3) having means holding said annular surfaces in said rotated position whereby said diaphragm is restrained from inward movement by the compressive forces exerted by said holding means,
  (D) an object, and
  (E) means secured to said first support member and holding said object to a fixed distance from said diaphragm.

2. An instrument according to claim 1 wherein
  (A) each inner periphery is planar, and
  (B) each support member is devoid, immediately adjacent said inner periphery on the annular surface thereof, of surfaces in the plane of said diaphragm or contacting said diaphragm to exert radial restraining forces thereon.

3. An instrument according to claim 1 wherein each of said annular surfaces is normally a frustoconical surface.

4. An instrument according to claim 1 wherein said holding means engages said support members, to urge said annular surfaces toward each other, at points spaced outward from said inner peripheries.

5. An instrument according to claim 1 wherein said holding means comprises a weld between said annular surfaces and between said diaphragm and said annular surfaces.

6. An instrument according to claim 1 wherein said support members exert substantial planar tension on said diaphragm at said inner peripheries.

7. An instrument according to claim 1
  (A) wherein said object is an electrical conductor, and
  (B) further comprising terminal means connected to said object,
  (C) wherein said diaphragm is an electrical conductor, and
  (D) wherein said object and terminal means are electrically insulated from said diaphragm.

8. A diaphragm type pressure transducer comprising
  (A) first and second metallic housing shells
    (1) each of which has an annular flange opposed to the flange on the other shell,
    (2) said flanges having opposed clamping surfaces that have opposed inner peripheral edges that in their free state are angled away from each other so that the minimum distance between said flanges is between the inner peripheral edges of the two clamping surfaces and the maximum distance between said flanges is between the outer peripheral edges of the two clamping surfaces,
  (B) a radially-tensioned, metallic, normally planar, membrane-like diaphragm clamped between said inner peripheral edges of said clamping surfaces and spanning the area within said outer peripheral edge of at least one clamping surface, (C) a weld connection between said diaphragm and said flanges holding said outer peripheral edges of said clamping surfaces closer together than they are in the free state when the inner peripheral edges compressively engage said diaphragm, said weld connection cooperating with said angled clamping surfaces to thereby generate compressive forces acting generally perpendicular to said diaphragm to provide the sole radial restraint resisting inward movement of said diaphragm, (D) whereby said flanges and said diaphragm are constrained to deform as a unitary elastic structure in response to forces perpendicular to said diaphragm, (E) at least one electrical terminal, (F) insulating means securing said terminal to said first housing shell and insulating it therefrom, and (G) a metallic object electrically connected to said terminal and fixedly supported from said terminal spaced and insulated from said diaphragm.

9. A method for making a diaphragm type instrument comprising the steps of (A) radially tensioning a metallic diaphragm, (B) clamping said diaphragm between first and second opposed inner peripheral edges of first and second metallic support members, respectively, each of which has a flange extending radially outward from said inner peripheral edge and normally spaced from the other flange, when said inner peripheral edges engage said diaphragm, by a distance greater than the distance between said inner peripheral edges and which spacing increases with the distance outward from said inner peripheral edge, (C) rotating said flanges toward each other by forces applied to said flanges outwardly from said inner peripheries to decrease the spacing between the outer portions of said flanges below said normal spacing, and (D) welding together said flanges and said diaphragm outwardly from said inner peripheral edges.

10. A method of making a diaphragm type instrument comprising the successive steps of (A) providing on opposite sides of a diaphragm first and second opposed support members, each of which has a clamping surface that
 (1) faces said diaphragm,
 (2) has an inner periphery substantially coincident with the inner periphery on the clamping surface of the other support member, and
 (3) has a portion that extends, when unrestrained, from its inner periphery in a direction
  (a) away from the center of the diaphragm area bounded by said inner periphery on said first support member, and
  (b) at an acute angle to the plane of said diaphragm area, and (B) constraining said support members toward each other
 (1) with said inner peripheries of said two clamping surfaces engaging said diaphragm,
 (2) with opposed points on said extending portions of said two clamping surfaces being closer together than when said support members are unrestrained, and
 (3) by means of forces applied to the support members outward from said inner peripheries to rotate said members together at the outer peripheries thereof and to thereby generate compressive forces at the inner periphery thereof in contact with said diaphragm to restrain inward motion of said diaphragm.

11. A method of making a diaphragm-type instrument comprising the successive steps of (A) providing first and second support members having, respectively, first and second clamping surfaces on opposite sides of a diaphragm,
 (1) each clamping surface
  (a) having an inner periphery, and
  (b) extending from its inner periphery away from the center of the area bounded by said periphery and at an acute angle to the plane of said area,
 (2) said first clamping surface being in engagement with one side of said diaphragm in a single surface only,
 (3) said second clamping surface being in engagement at said inner periphery thereon with the other side of said diaphragm in a single surface only,
 (4) said first and second clamping surfaces normally diverging from each other at points outward from said inner periphery, (B) supporting an electrical element from one of said support members at a fixed distance from said diaphragm on the same side of said diaphragm as said second clamping surface, (C) constraining said support members toward each other and against said diaphragm by forces applied outwardly of the clamping surfaces in engagement with said diaphragm to rotate the opposed clamping surfaces toward each other and closer together than when said support members are unrestrained; and (D) clamping said support members in said constrained position.

12. An instrument for measuring the deflection of a diaphragm with respect to an object, said instrument comprising (A) a diaphragm, (B) first and second support members having opposed clamping surfaces on opposite sides of said diaphragm,
 (1) each clamping surface having an inner periphery and at least a portion extending outward from said inner periphery in a direction that extends aways from the center of the area bounded by its inner periphery and at an acute angle to the plane of the bounded area,
 (2) said first clamping surface being in engagement with one side of said diaphragm in a single surface only,
 (3) said second clamping surface being in engagement at said inner periphery thereon with the other side of said diaphragm in a single surface only, and
 (4) said clamping surfaces normally diverging from each other at said extending portions thereof, (C) means applying net opposing forces to said extending portions of said clamping surfaces outwardly of said inner peripheries to thereby rotate said surfaces closer together than normally so that said clamping surfaces exert substantial compressional clamping forces on said diaphragm at said inner periphery of said second clamping surface, (D) an object, and (E) means secured to said second support member and holding said object at a fixed distance from said diaphragm.

13. An instrument according to claim 12 in which said first clamping surface is devoid of portions extending further toward said second surface than the portion of said first surface opposite said inner periphery of said second surface.

14. An instrument according to claim 12 wherein (A) said inner peripheries of said first and second support member clamping surfaces are substantially coincident, and, (B) each support member is devoid, at point inward from the inner periphery on the clamping surface thereof, of surfaces in engagement with said diaphragm.

15. An instrument according to claim 12 wherein each clamping surface is frustoconical and of such small relief that at least a portion of each clamping surface outward from said inner periphery of said second surface engages said diaphragm when said support members are engaged by said constraining means.

References Cited

UNITED STATES PATENTS

| | | | |
|---|---|---|---|
| 1,001,810 | 8/1911 | Brown | 73—407 |
| 2,999,385 | 9/1961 | Wolfe | 73—398 |
| 3,324,727 | 6/1967 | Smith | 73—398 |

S. CLEMENT SWISHER, *Primary Examiner.*

D. E. CORR, *Assistant Examiner.*

U.S. Cl. X.R.

73—398